(12) United States Patent
Berggren

(10) Patent No.: US 6,279,850 B1
(45) Date of Patent: Aug. 28, 2001

(54) CABLE FORERUNNER

(75) Inventor: Soren Berggren, Vasteras (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/297,608

(22) PCT Filed: Nov. 4, 1997

(86) PCT No.: PCT/SE97/01839

§ 371 Date: Jun. 8, 1999

§ 102(e) Date: Jun. 8, 1999

(87) PCT Pub. No.: WO98/20602

PCT Pub. Date: May 14, 1998

(30) Foreign Application Priority Data

Nov. 4, 1996 (SE) .................................................. 9604025

(51) Int. Cl.$^7$ .................................................. B65H 23/06
(52) U.S. Cl. .............................................. 242/432; 310/42
(58) Field of Search .............................. 310/42; 242/432, 242/432.1, 432.6, 433.4, 434, 264.4; 140/48; 226/92

(56) References Cited

U.S. PATENT DOCUMENTS

| 681,800 | 9/1901 | Lasche ................................. 310/254 |
|---|---|---|
| 847,008 | 3/1907 | Kitsee . |
| 1,304,451 | 5/1919 | Burnham .................................. 336/57 |
| 1,418,856 | 6/1922 | Williamson ............................ 310/196 |
| 1,481,585 | 1/1924 | Beard .................................. 336/84 R |
| 1,508,456 | 9/1924 | Lenz . |
| 1,728,915 | 9/1929 | Blankenship et al. .............. 242/157.1 |
| 1,742,985 | 1/1930 | Burnham .................................. 336/60 |
| 1,747,507 | 2/1930 | George .................................. 336/60 |
| 1,756,672 | 4/1930 | Barr ........................................ 310/259 |
| 1,762,775 | 6/1930 | Ganz ........................................ 333/32 |
| 1,781,308 | 11/1930 | Vos .......................................... 336/69 |
| 1,861,182 | 5/1932 | Hendey et al. ................... 174/106 R |
| 1,904,885 | 4/1933 | Seeley . |
| 1,974,406 | 9/1934 | Apple et al. .......................... 310/215 |

(List continued on next page.)

FOREIGN PATENT DOCUMENTS

| 399790 | 7/1995 | (AT) . |
|---|---|---|
| 565063 | 2/1957 | (BE) . |
| 391071 | 4/1965 | (CH) . |

(List continued on next page.)

OTHER PUBLICATIONS

Shipboard Electrical Insulation; G. L. Moses, 1951, pp2&3.
ABB Elkrafthandbok; ABB AB; 1988 ; pp274–276.
Elkraft teknisk Handbok, 2 Elmaskiner; A. Alfredsson et al; 1988, pp 121–123.

(List continued on next page.)

Primary Examiner—Elvin Enad
(74) Attorney, Agent, or Firm—Dykema Gossett PLLC

(57) ABSTRACT

A cable forerunner for winding a high-voltage cable in an electric machine, wherein one end of the cable forerunner (11) is attached to the end (10) of the cable (1), the cable forerunner (11) is arranged to draw the cable (1) through a first slot (15) arranged in the machine body (8) and also to control the curvature of the cable (1) at its exit from the slot (15) unitl its entry into a second slot (16) arranged in the machine body (8), as well as a procedure and also an electric machine having at least one winding comprising a high-voltage cable wound in accordance with the procedure for winding a high-voltage cable (1) in an electric machine, wherein one end of the cable forerunner (11) is attached to the end of the cable (1), whereafter the cable forerunner (11) is caused to draw the cable (1) through a first slot (15) arranged in the machine body (8) and to control the curvature of the cable (1) at its exit from the slot until its entry into a second slot (16) arranged in the machine body (8).

25 Claims, 1 Drawing Sheet

U.S. PATENT DOCUMENTS

| | | | |
|---|---|---|---|
| 2,006,170 | 6/1935 | Juhlin | 310/195 |
| 2,206,856 | 7/1940 | Shearer | 336/116 |
| 2,217,430 | 10/1940 | Baudry | 310/54 |
| 2,241,832 | 5/1941 | Wahlquist | 307/105 |
| 2,251,291 | 8/1941 | Reichelt | 226/172 |
| 2,256,897 | 9/1941 | Davidson et al. | 174/85 |
| 2,295,415 | 9/1942 | Monroe | 336/60 |
| 2,409,893 | 10/1946 | Pendleton et al. . | |
| 2,415,652 | 2/1947 | Norton | 174/107 |
| 2,424,443 | 7/1947 | Evans | 310/259 |
| 2,436,306 | 2/1948 | Johnson | 174/73.1 |
| 2,446,999 | 8/1948 | Camilli | 336/178 |
| 2,459,322 | 1/1949 | Johnston | 336/57 |
| 2,462,651 | 2/1949 | Lord | 336/183 |
| 2,498,238 | 2/1950 | Berberich et al. | 174/120 SC |
| 2,650,350 | 8/1953 | Heath . | |
| 2,721,905 | 10/1955 | Monroe | 360/291.3 |
| 2,749,456 | 6/1956 | Luenberger . | |
| 2,780,771 | 2/1957 | Lee | 323/329 |
| 2,846,599 | 8/1958 | McAdam | 310/43 |
| 2,885,581 | 5/1959 | Pileggi | 310/260 |
| 2,936,961 * | 5/1960 | Roberts | 242/432.1 |
| 2,943,242 | 6/1960 | Schaschl et al. | 316/212 |
| 2,947,957 | 8/1960 | Spindler | 336/61 |
| 2,959,699 | 11/1960 | Smith et al. | 310/260 |
| 2,962,679 | 11/1960 | Stratton | 336/83 |
| 2,975,309 | 3/1961 | Seidner | 310/54 |
| 3,014,139 * | 12/1961 | Shildneck | 310/64 |
| 3,098,893 | 7/1963 | Pringle et al. | 174/102 SC |
| 3,130,335 | 4/1964 | Rejda | 310/215 |
| 3,143,269 | 8/1964 | Van Eldik | 226/172 |
| 3,157,806 | 11/1964 | Wiedemann | 310/64 |
| 3,158,770 | 11/1964 | Coggeshall et al. | 310/214 |
| 3,197,723 | 7/1965 | Dortort . | |
| 3,268,766 | 8/1966 | Amos | 361/212 |
| 3,304,599 | 2/1967 | Nordin | 29/605 |
| 3,354,331 | 11/1967 | Broeker et al. | 310/196 |
| 3,365,657 | 1/1968 | Webb | 323/206 |
| 3,372,283 | 3/1968 | Jaecklin | 307/83 |
| 3,392,779 | 7/1968 | Tilbrook . | |
| 3,411,027 | 11/1968 | Rosenberg . | |
| 3,418,530 | 12/1968 | Cheever | 361/56 |
| 3,435,262 | 3/1969 | Bennett et al. | 310/54 |
| 3,437,858 | 4/1969 | White | 310/214 |
| 3,444,407 | 5/1969 | Yates | 310/215 |
| 3,447,002 | 5/1969 | Ronnevig | 310/54 |
| 3,484,690 | 12/1969 | Wald | 324/107 |
| 3,541,221 | 11/1970 | Aupoix et al. . | |
| 3,560,777 | 2/1971 | Moeller | 310/270 |
| 3,571,690 | 3/1971 | Lataisa . | |
| 3,593,123 | 7/1971 | Williamson | 324/545 |
| 3,631,519 | 12/1971 | Salahshourian | 174/73.1 |
| 3,644,662 | 2/1972 | Salahshourian | 174/73.1 |
| 3,651,244 | 3/1972 | Silver et al. . | |
| 3,651,402 | 3/1972 | Leffmann | 324/772 |
| 3,660,721 | 5/1972 | Baird . | |
| 3,666,876 | 5/1972 | Forster . | |
| 3,670,192 | 6/1972 | Andersson et al. | 310/196 |
| 3,675,056 | 7/1972 | Lenz | 310/54 |
| 3,684,821 | 8/1972 | Miyauchi et al. | 174/102 SC |
| 3,684,906 | 8/1972 | Lexz . | |
| 3,699,238 | 10/1972 | Hansen et al. . | |
| 3,716,652 | 2/1973 | Lusk et al. | 174/15.3 |
| 3,716,719 | 2/1973 | Angelery et al. | 307/17 |
| 3,727,085 | 4/1973 | Goetz et al. | 310/54 |
| 3,740,600 | 6/1973 | Turley | 310/194 |
| 3,743,867 | 7/1973 | Smith, Jr. . | |
| 3,746,954 | 7/1973 | Myles et al. | 318/247 |
| 3,758,699 | 9/1973 | Lusk et al. | 174/19 |
| 3,778,891 | 12/1973 | Amasino et al. | 29/596 |
| 3,781,739 | 12/1973 | Meyer | 336/70 |
| 3,787,000 * | 1/1974 | Farnsworth et al. | 242/432.4 |
| 3,787,607 | 1/1974 | Schlafly . | |
| 3,792,399 | 2/1974 | McLyman | 336/210 |
| 3,801,843 | 4/1974 | Corman et al. | 310/52 |
| 3,809,933 | 5/1974 | Sugawara et al. | 310/52 |
| 3,813,764 | 6/1974 | Tanaka et al. . | |
| 3,828,115 | 8/1974 | Hvizd, Jr. . | |
| 3,881,647 | 5/1975 | Wolfe | 226/172 |
| 3,884,154 | 5/1975 | Marten | 104/286 |
| 3,891,880 | 6/1975 | Britsch | 310/196 |
| 3,902,000 | 8/1975 | Forsyth et al. | 174/15.3 |
| 3,912,957 | 10/1975 | Reynolds . | |
| 3,932,779 | 1/1976 | Madsen | 310/215 |
| 3,932,791 | 1/1976 | Oswald | 361/100 |
| 3,943,392 | 3/1976 | Keuper et al. | 310/215 |
| 3,947,278 | 3/1976 | Youtsey | 106/31.68 |
| 3,965,408 | 6/1976 | Higuchi et al. | 363/75 |
| 3,968,388 | 7/1976 | Lambrecht et al. | 310/53 |
| 3,971,543 | 7/1976 | Shanahan | 254/134.3 R |
| 3,974,314 | 8/1976 | Fuchs | 428/212 |
| 3,993,860 | 11/1976 | Snow et al. . | |
| 3,995,785 | 12/1976 | Arick et al. | 29/596 |
| 4,001,616 | 1/1977 | Lonseth et al. | 310/45 |
| 4,008,367 | 2/1977 | Sunderhauf . | |
| 4,008,409 | 2/1977 | Rhudy et al. | 310/45 |
| 4,031,310 | 6/1977 | Jachimowicz | 174/15.6 |
| 4,039,740 | 8/1977 | Iwata | 174/15.5 |
| 4,041,431 | 8/1977 | Enoksen | 336/160 |
| 4,047,138 | 9/1977 | Steigerwald | 336/100 |
| 4,064,419 | 12/1977 | Peterson | 323/201 |
| 4,084,307 | 4/1978 | Schultz et al. | 29/460 |
| 4,085,347 | 4/1978 | Lichius | 310/259 |
| 4,088,953 | 5/1978 | Sarian | 324/232 |
| 4,091,138 | 5/1978 | Takagi et al. | 428/209 |
| 4,091,139 | 5/1978 | Quirk | 442/117 |
| 4,099,227 | 7/1978 | Liptak | 363/126 |
| 4,103,075 | 7/1978 | Adam | 428/614 |
| 4,106,069 | 8/1978 | Trautner et al. | 361/30 |
| 4,107,092 | 8/1978 | Carnahan et al. | 252/511 |
| 4,109,098 | 8/1978 | Olsson et al. | 174/106 SC |
| 4,121,148 | 10/1978 | Platzer | 322/59 |
| 4,132,914 | 1/1979 | Khutoretsky . | |
| 4,134,036 | 1/1979 | Curtiss | 310/42 |
| 4,134,055 | 1/1979 | Akamatsu | 318/696 |
| 4,134,146 | 1/1979 | Stetson | 361/130 |
| 4,149,101 | 4/1979 | Lesokhin et al. | 310/214 |
| 4,152,615 | 5/1979 | Calfo et al. | 310/256 |
| 4,160,193 | 7/1979 | Richmond | 315/281 |
| 4,164,672 | 8/1979 | Flick | 310/54 |
| 4,164,772 | 8/1979 | Hingorani | 361/58 |
| 4,177,397 | 12/1979 | Lill | 310/71 |
| 4,177,418 | 12/1979 | Brueckner et al. | 323/250 |
| 4,184,186 | 1/1980 | Barkan | 361/10 |
| 4,200,817 | 4/1980 | Bratoljic | 310/198 |
| 4,200,818 | 4/1980 | Ruffing et al. | 310/214 |
| 4,206,434 | 6/1980 | Hase | 336/5 |
| 4,207,427 | 6/1980 | Beretta et al. | 174/26 R |
| 4,207,482 | 6/1980 | Neumeyer et al. | 310/45 |
| 4,208,597 | 6/1980 | Mulach et al. | 310/59 |
| 4,229,721 | 10/1980 | Koloczek et al. | 336/133 |
| 4,238,339 | 12/1980 | Khutoretsky et al. | 310/260 |
| 4,239,999 | 12/1980 | Vinokurov et al. | 310/52 |
| 4,245,182 | 1/1981 | Aotsu et al. | 322/20 |
| 4,246,694 | 1/1981 | Raschbichler et al. | 29/596 |
| 4,255,684 | 3/1981 | Mischler et al. | 310/216 |
| 4,258,280 | 3/1981 | Starcevic | 310/157 |
| 4,262,209 | 4/1981 | Berner | 290/7 |
| 4,274,027 | 6/1981 | Higuchi et al. | 310/269 |
| 4,281,264 | 7/1981 | Keim et al. | 310/194 |
| 4,292,558 | 9/1981 | Flick et al. | 310/194 |

| Patent No. | Date | Inventor | Class |
|---|---|---|---|
| 4,307,311 | 12/1981 | Grozinger | 310/179 |
| 4,308,476 | 12/1981 | Schuler | 310/45 |
| 4,308,575 | 12/1981 | Mase | 363/48 |
| 4,310,966 | 1/1982 | Brietenbach | 29/596 |
| 4,314,168 | 2/1982 | Breitenbach . | |
| 4,317,001 | 2/1982 | Silver et al. | 174/102 SC |
| 4,320,645 | 3/1982 | Stanley | 72/132 |
| 4,321,426 | 3/1982 | Schaeffer . | |
| 4,321,518 | 3/1982 | Akamatsu | 318/696 |
| 4,330,726 | 5/1982 | Albright et al. | 310/254 |
| 4,337,922 | 7/1982 | Streiff et al. | 254/134.3 FT |
| 4,341,989 | 7/1982 | Sandberg et al. | 322/95 |
| 4,347,449 | 8/1982 | Beau | 310/42 |
| 4,347,454 | 8/1982 | Gellert et al. | 310/193 |
| 4,357,542 | 11/1982 | Kirschbaum | 290/44 |
| 4,360,748 | 11/1982 | Raschbichler et al. | 310/13 |
| 4,361,723 | 11/1982 | Hvizd, Jr. et al. . | |
| 4,363,612 | 12/1982 | Walchhutter | 425/167 |
| 4,365,178 | 12/1982 | Lexz . | |
| 4,367,425 | 1/1983 | Mendelsohn et al. | 310/260 |
| 4,367,890 | 1/1983 | Spirk . | |
| 4,368,418 | 1/1983 | Demello et al. | 323/201 |
| 4,369,389 | 1/1983 | Lambrecht | 310/214 |
| 4,371,745 | 2/1983 | Sakashita | 174/115 |
| 4,384,944 | 5/1983 | Silver et al. . | |
| 4,387,316 | 6/1983 | Katsekas | 310/214 |
| 4,401,920 | 8/1983 | Taylor et al. . | |
| 4,403,163 | 9/1983 | Rarmerding et al. | 310/213 |
| 4,404,486 | 9/1983 | Keim et al. | 310/198 |
| 4,411,710 | 10/1983 | Mochizuki et al. | 148/243 |
| 4,421,284 | 12/1983 | Pan | 242/478.1 |
| 4,425,521 | 1/1984 | Rosenberry, Jr. et al. | 310/214 |
| 4,426,771 | 1/1984 | Wang et al. | 29/596 |
| 4,429,244 | 1/1984 | Nikiten et al. | 310/254 |
| 4,431,960 | 2/1984 | Zucker | 323/340 |
| 4,432,029 | 2/1984 | Lundqvist . | |
| 4,437,464 | 3/1984 | Crow . | |
| 4,443,725 | 4/1984 | Derderian et al. | 310/214 |
| 4,470,884 | 9/1984 | Carr | 205/139 |
| 4,473,765 | 9/1984 | Butman, Jr. et al. | 310/215 |
| 4,475,075 | 10/1984 | Munn | 322/1 |
| 4,477,690 | 10/1984 | Nikitin et al. | 174/15.6 |
| 4,481,438 | 11/1984 | Keim | 310/201 |
| 4,484,106 | 11/1984 | Taylor et al. . | |
| 4,488,079 | 12/1984 | Dailey et al. | 310/260 |
| 4,490,651 | 12/1984 | Taylor et al. . | |
| 4,503,284 | 3/1985 | Minnick et al. | 174/36 |
| 4,508,251 | 4/1985 | Harada et al. . | |
| 4,510,077 | 4/1985 | Elton | 252/502 |
| 4,517,471 | 5/1985 | Sachs | 307/67 |
| 4,520,287 | 5/1985 | Wang et al. . | |
| 4,523,249 | 6/1985 | Arimoto | 361/58 |
| 4,538,131 | 8/1985 | Baier et al. | 336/57 |
| 4,546,210 | 10/1985 | Akiba et al. | 174/114 R |
| 4,551,780 | 11/1985 | Canay | 361/113 |
| 4,557,038 | 12/1985 | Wcislo et al. | 29/596 |
| 4,560,896 | 12/1985 | Vogt et al. | 310/215 |
| 4,565,929 | 1/1986 | Baskin et al. | 290/44 |
| 4,571,453 | 2/1986 | Takaoka et al. . | |
| 4,588,916 | 5/1986 | Lis | 310/260 |
| 4,590,416 | 5/1986 | Porche et al. | 323/205 |
| 4,594,630 | 6/1986 | Rabinowitz et al. | 361/13 |
| 4,607,183 | 8/1986 | Rieber et al. | 310/214 |
| 4,615,109 | 10/1986 | Wcislo et al. | 29/732 |
| 4,615,778 | 10/1986 | Elton . | |
| 4,618,795 | 10/1986 | Cooper et al. | 310/260 |
| 4,619,040 | 10/1986 | Wang et al. | 29/596 |
| 4,622,116 | 11/1986 | Elton et al. . | |
| 4,633,109 | 12/1986 | Feigel | 310/68 R |
| 4,650,924 | 3/1987 | Kauffman et al. | 174/117 F |
| 4,652,963 | 3/1987 | Fahlen . | |
| 4,656,316 | 4/1987 | Meltsch | 174/92 |
| 4,656,379 | 4/1987 | McCarty | 310/181 |
| 4,677,328 | 6/1987 | Kumakura | 310/67 R |
| 4,687,882 | 8/1987 | Stone et al. | 174/102 SC |
| 4,692,731 | 9/1987 | Osinga | 335/299 |
| 4,723,083 | 2/1988 | Elton . | |
| 4,723,104 | 2/1988 | Rohatyn | 318/813 |
| 4,724,345 | 2/1988 | Elton et al. . | |
| 4,732,412 | 3/1988 | van der Linden et al. . | |
| 4,737,704 | 4/1988 | Kalinnikov et al. | 323/328 |
| 4,745,314 | 5/1988 | Nakano | 310/57 |
| 4,761,602 | 8/1988 | Leibovich . | |
| 4,766,365 | 8/1988 | Bolduc et al. | 323/308 |
| 4,771,168 | 9/1988 | Gundersen et al. . | |
| 4,785,138 | 11/1988 | Brietenbach et al. | 174/106 SC |
| 4,795,933 | 1/1989 | Sakai | 310/269 |
| 4,827,172 | 5/1989 | Kobayashi | 310/216 |
| 4,845,308 | 7/1989 | Womack, Jr. et al. | 174/15.4 |
| 4,847,747 | 7/1989 | Abbondanti | 363/138 |
| 4,853,565 | 8/1989 | Elton et al. | 310/45 |
| 4,859,810 | 8/1989 | Cloetens et al. | 174/110 PM |
| 4,859,989 | 8/1989 | McPherson . | |
| 4,860,430 | 8/1989 | Raschbichler et al. | 29/596 |
| 4,864,266 | 9/1989 | Feather et al. | 336/150 |
| 4,883,230 | 11/1989 | Linstrom | 242/474.4 |
| 4,890,040 | 12/1989 | Gundersen . | |
| 4,894,284 | 1/1990 | Yamanouchi et al. | 428/378 |
| 4,914,386 | 4/1990 | Zocholl | 324/772 |
| 4,918,347 | 4/1990 | Takaba | 310/179 |
| 4,918,835 | 4/1990 | Raschbichler et al. | 29/732 |
| 4,924,342 | 5/1990 | Lee | 361/58 |
| 4,926,079 | 5/1990 | Niemela et al. | 310/71 |
| 4,942,326 | 7/1990 | Butler, III et al. | 310/260 |
| 4,949,001 | 8/1990 | Campbell | 310/220 |
| 4,982,147 | 1/1991 | Lauw . | |
| 4,994,952 | 2/1991 | Silva et al. | 363/56 |
| 4,997,995 | 3/1991 | Simmons et al. | 174/120 SC |
| 5,012,125 | 4/1991 | Conway | 307/149 |
| 5,030,813 | 7/1991 | Stanisz . | |
| 5,036,165 | 7/1991 | Elton et al. | 174/102 SC |
| 5,036,238 | 7/1991 | Tajima | 310/214 |
| 5,066,881 | 11/1991 | Elton et al. | 310/213 |
| 5,067,046 | 11/1991 | Elton et al. | 361/220 |
| 5,067,843 | * 11/1991 | Nova | 403/301 |
| 5,083,360 | 1/1992 | Valencic et al. | 29/606 |
| 5,086,246 | 2/1992 | Dymond et al. | 310/269 |
| 5,091,609 | 2/1992 | Swada et al. . | |
| 5,094,703 | 3/1992 | Takaoka et al. | 148/269 |
| 5,095,175 | 3/1992 | Yoshida et al. . | |
| 5,097,241 | 3/1992 | Smith et al. | 336/60 |
| 5,097,591 | 3/1992 | Wcislo et al. | 29/762 |
| 5,111,095 | 5/1992 | Hendershot | 310/168 |
| 5,124,607 | 6/1992 | Rieber et al. | 310/214 |
| 5,136,459 | 8/1992 | Fararooy | 361/93.2 |
| 5,140,290 | 8/1992 | Dersch | 505/211 |
| 5,153,460 | 10/1992 | Bovino et al. | 307/108 |
| 5,168,662 | 12/1992 | Nakamura et al. | 451/46 |
| 5,171,941 | 12/1992 | Shimizu et al. . | |
| 5,182,537 | 1/1993 | Thuis . | |
| 5,187,428 | 2/1993 | Hutchison et al. | 323/250 |
| 5,201,269 | * 4/1993 | Eckert | 101/228 |
| 5,231,249 | 7/1993 | Kimura et al. . | |
| 5,235,488 | 8/1993 | Koch | 361/45 |
| 5,246,783 | 9/1993 | Spenadel et al. | 428/461 |
| 5,263,414 | * 11/1993 | Lehrrieder et al. | 226/92 |
| 5,264,778 | 11/1993 | Kimmel et al. | 322/25 |
| 5,287,262 | 2/1994 | Klein . | |
| 5,304,883 | 4/1994 | Denk | 310/180 |
| 5,305,961 | 4/1994 | Errard et al. | 242/447.1 |
| 5,321,308 | 6/1994 | Johncock | 290/40 C |
| 5,323,330 | 6/1994 | Asplund et al. | 700/292 |

| | | | | | | |
|---|---|---|---|---|---|---|
| 5,325,008 | 6/1994 | Grant | 310/214 | 719009 | 3/1942 | (DE) . |
| 5,325,259 | 6/1994 | Paulsson . | | 846583 | 8/1952 | (DE) . |
| 5,327,637 | 7/1994 | Britenbach et al. | 29/596 | 875227 | 4/1953 | (DE) . |
| 5,341,281 | 8/1994 | Skibinski | 363/39 | 975999 | 1/1963 | (DE) . |
| 5,343,139 | 8/1994 | Gyugyi et al. | 323/207 | 1465719 | 5/1969 | (DE) . |
| 5,355,046 | 10/1994 | Weigelt | 310/260 | 1807391 | 5/1970 | (DE) . |
| 5,365,132 | 11/1994 | Hann et al. | 310/58 | 2050674 | 5/1971 | (DE) . |
| 5,387,890 | 2/1995 | Estop et al. | 335/216 | 1638176 | 6/1971 | (DE) . |
| 5,397,513 | 3/1995 | Steketee, Jr. | 264/36.17 | 2155371 | 5/1973 | (DE) . |
| 5,399,941 | 3/1995 | Grothaus et al. . | | 2400698 | 7/1975 | (DE) . |
| 5,400,005 | 3/1995 | Bobry | 336/83 | 2520511 | 11/1976 | (DE) . |
| 5,408,169 | 4/1995 | Jeanneret . | | 2656389 | 6/1978 | (DE) . |
| 5,449,861 | 9/1995 | Fujino et al. . | | 2721905 | 11/1978 | (DE) . |
| 5,452,170 | 9/1995 | Ohde et al. | 361/13 | 2824951 | 12/1979 | (DE) . |
| 5,468,916 | 11/1995 | Litenas et al. | 174/127 | 2835386 | 2/1980 | (DE) . |
| 5,499,178 | 3/1996 | Mohan . | | 2839517 | 3/1980 | (DE) . |
| 5,500,632 | 3/1996 | Halser, III | 336/180 | 2854520 | 6/1980 | (DE) . |
| 5,510,942 | 4/1996 | Bock et al. | 361/16 | 3009102 | 9/1980 | (DE) . |
| 5,530,307 | 6/1996 | Horst | 310/156 | 2913697 | 10/1980 | (DE) . |
| 5,533,658 | 7/1996 | Benedict et al. . | | 2920478 | 12/1980 | (DE) . |
| 5,534,754 | 7/1996 | Pourney . | | 3028777 | 3/1981 | (DE) . |
| 5,545,853 | 8/1996 | Hildreth | 174/120 R | 2939004 | 4/1981 | (DE) . |
| 5,550,410 | 8/1996 | Titus | 290/52 | 3006382 | 8/1981 | (DE) . |
| 5,583,387 | 12/1996 | Takeuchi et al. | 310/217 | 3008818 | 9/1981 | (DE) . |
| 5,587,126 | 12/1996 | Steketee, Jr. | 264/568 | 209313 | 4/1984 | (DE) . |
| 5,598,137 | 1/1997 | Alber et al. | 336/223 | 3305225 | 8/1984 | (DE) . |
| 5,607,320 | 3/1997 | Wright | 439/394 | 3309051 | 9/1984 | (DE) . |
| 5,612,510 | 3/1997 | Hildreth | 174/120 SC | 3441311 | 5/1986 | (DE) . |
| 5,663,605 | 9/1997 | Evans et al. | 310/181 | 3543106 | 6/1987 | (DE) . |
| 5,672,926 | 9/1997 | Brandes et al. | 310/181 | 2917717 | 8/1987 | (DE) . |
| 5,689,223 | 11/1997 | Demarmels et al. | 335/216 | 3612112 | 10/1987 | (DE) . |
| 5,807,447 | 9/1998 | Forrest | 156/51 | 3726346 | 2/1989 | (DE) . |
| 5,834,699 | 11/1998 | Buck et al. . | | 3925337 | 2/1991 | (DE) . |
| 5,996,873 | * 12/1999 | Pimpis | 226/92 | 4023903 | 11/1991 | (DE) . |

FOREIGN PATENT DOCUMENTS

| | | |
|---|---|---|
| 266037 | 10/1965 | (CH) . |
| 534448 | 2/1973 | (CH) . |
| 539328 | 7/1973 | (CH) . |
| 646403 | 2/1979 | (CH) . |
| 657482 | 8/1986 | (CH) . |
| 1189322 | 10/1986 | (CH) . |
| 137164 | 8/1979 | (DD) . |
| 138840 | 11/1979 | (DD) . |
| 40414 | 8/1887 | (DE) . |
| 134022 | 12/1901 | (DE) . |
| 277012 | 7/1914 | (DE) . |
| 336418 | 6/1920 | (DE) . |
| 372390 | 3/1923 | (DE) . |
| 386561 | 12/1923 | (DE) . |
| 387973 | 1/1924 | (DE) . |
| 406371 | 11/1924 | (DE) . |
| 425551 | 2/1926 | (DE) . |
| 426793 | 3/1926 | (DE) . |
| 432169 | 7/1926 | (DE) . |
| 433749 | 9/1926 | (DE) . |
| 435608 | 10/1926 | (DE) . |
| 435609 | 10/1926 | (DE) . |
| 441717 | 3/1927 | (DE) . |
| 443011 | 4/1927 | (DE) . |
| 460124 | 5/1928 | (DE) . |
| 482506 | 9/1929 | (DE) . |
| 501181 | 7/1930 | (DE) . |
| 523047 | 4/1931 | (DE) . |
| 568508 | 1/1933 | (DE) . |
| 572030 | 3/1933 | (DE) . |
| 584639 | 9/1933 | (DE) . |
| 586121 | 10/1933 | (DE) . |
| 604972 | 11/1934 | (DE) . |
| 629301 | 4/1936 | (DE) . |
| 673545 | 3/1939 | (DE) . |
| 4022476 | 1/1992 | (DE) . |
| 4233558 | 3/1994 | (DE) . |
| 4402184 | 8/1995 | (DE) . |
| 4409794 | 8/1995 | (DE) . |
| 4412761 | 10/1995 | (DE) . |
| 4420322 | 12/1995 | (DE) . |
| 19620906 | 1/1996 | (DE) . |
| 4438186 | 5/1996 | (DE) . |
| 19020222 | 3/1997 | (DE) . |
| 195 47 229 | 6/1997 | (DE) . |
| 468827 | 7/1997 | (DE) . |
| 049104 | 4/1982 | (EP) . |
| 0493704 | 4/1982 | (EP) . |
| 0056580 A1 | 7/1982 | (EP) . |
| 078908 | 5/1983 | (EP) . |
| 0120154 | 10/1984 | (EP) . |
| 0130124 | 1/1985 | (EP) . |
| 0142813 | 5/1985 | (EP) . |
| 0155405 | 9/1985 | (EP) . |
| 0102513 | 1/1986 | (EP) . |
| 0174783 | 3/1986 | (EP) . |
| 0185788 | 7/1986 | (EP) . |
| 0277358 | 8/1986 | (EP) . |
| 0234521 | 9/1987 | (EP) . |
| 0244069 | 11/1987 | (EP) . |
| 0246377 | 11/1987 | (EP) . |
| 0265868 | 5/1988 | (EP) . |
| 0274691 | 7/1988 | (EP) . |
| 0280759 | 9/1988 | (EP) . |
| 0282876 | 9/1988 | (EP) . |
| 0309096 | 3/1989 | (EP) . |
| 0314860 | 5/1989 | (EP) . |
| 0316911 | 5/1989 | (EP) . |
| 0317248 | 5/1989 | (EP) . |
| 0335430 | 10/1989 | (EP) . |
| 0342554 | 11/1989 | (EP) . |
| 0221404 | 5/1990 | (EP) . |

| | | | | | | |
|---|---|---|---|---|---|---|
| 0375101 | 6/1990 | (EP) . | | 1103099 | 2/1968 | (GB) . |
| 0406437 | 1/1991 | (EP) . | | 1117401 | 6/1968 | (GB) . |
| 0439410 | 7/1991 | (EP) . | | 1135242 | 12/1968 | (GB) . |
| 0440865 | 8/1991 | (EP) . | | 1147049 | 4/1969 | (GB) . |
| 0469155 A1 | 2/1992 | (EP) . | | 1157885 | 7/1969 | (GB) . |
| 0490705 | 6/1992 | (EP) . | | 1174659 | 12/1969 | (GB) . |
| 0503817 | 9/1992 | (EP) . | | 1236082 | 6/1971 | (GB) . |
| 0571155 | 11/1993 | (EP) . | | 1268770 | 3/1972 | (GB) . |
| 0620570 | 10/1994 | (EP) . | | 1319257 | 6/1973 | (GB) . |
| 0620630 | 10/1994 | (EP) . | | 1322433 | 7/1973 | (GB) . |
| 0642027 | 3/1995 | (EP) . | | 1340983 | 12/1973 | (GB) . |
| 0671632 | 9/1995 | (EP) . | | 1341050 | 12/1973 | (GB) . |
| 0676777 | 10/1995 | (EP) . | | 1365191 | 8/1974 | (GB) . |
| 0677915 | 10/1995 | (EP) . | | 1395152 | 5/1975 | (GB) . |
| 0684679 | 11/1995 | (EP) . | | 1424982 | 2/1976 | (GB) . |
| 0684682 | 11/1995 | (EP) . | | 1426594 | 3/1976 | (GB) . |
| 0695019 | 1/1996 | (EP) . | | 1438610 | 6/1976 | (GB) . |
| 0732787 | 9/1996 | (EP) . | | 1445284 | 8/1976 | (GB) . |
| 0738034 | 10/1996 | (EP) . | | 1479904 | 7/1977 | (GB) . |
| 0739087 A2 | 10/1996 | (EP) . | | 1493163 | 11/1977 | (GB) . |
| 0740315 | 10/1996 | (EP) . | | 1502938 | 3/1978 | (GB) . |
| 0749190 A2 | 12/1996 | (EP) . | | 1525745 | 9/1978 | (GB) . |
| 0751605 | 1/1997 | (EP) . | | 2000625 | 1/1979 | (GB) . |
| 0739087 A3 | 3/1997 | (EP) . | | 1548633 | 7/1979 | (GB) . |
| 0749193 A3 | 3/1997 | (EP) . | | 2046142 | 11/1979 | (GB) . |
| 0780926 | 6/1997 | (EP) . | | 2022327 | 12/1979 | (GB) . |
| 0802542 | 10/1997 | (EP) . | | 2025150 | 1/1980 | (GB) . |
| 0913912 A1 | 5/1999 | (EP) . | | 2034101 | 5/1980 | (GB) . |
| 805544 | 4/1936 | (FR) . | | 1574796 | 9/1980 | (GB) . |
| 841351 | 1/1938 | (FR) . | | 2070341 | 9/1981 | (GB) . |
| 847899 | 12/1938 | (FR) . | | 2070470 | 9/1981 | (GB) . |
| 916959 | 12/1946 | (FR) . | | 2071433 | 9/1981 | (GB) . |
| 1011924 | 4/1949 | (FR) . | | 2081523 | 2/1982 | (GB) . |
| 1126975 | 3/1955 | (FR) . | | 2099635 | 12/1982 | (GB) . |
| 1238795 | 7/1959 | (FR) . | | 2105925 | 3/1983 | (GB) . |
| 2108171 | 5/1972 | (FR) . | | 2106306 | 4/1983 | (GB) . |
| 2251938 | 6/1975 | (FR) . | | 2106721 | 4/1983 | (GB) . |
| 2305879 | 10/1976 | (FR) . | | 2136214 | 9/1984 | (GB) . |
| 2376542 | 7/1978 | (FR) . | | 2140195 | 11/1984 | (GB) . |
| 2467502 | 4/1981 | (FR) . | | 2150153 | 6/1985 | (GB) . |
| 2481531 | 10/1981 | (FR) . | | 2268337 | 1/1994 | (GB) . |
| 2556146 | 6/1985 | (FR) . | | 2273819 | 6/1994 | (GB) . |
| 2594271 | 8/1987 | (FR) . | | 2283133 | 4/1995 | (GB) . |
| 2708157 | 1/1995 | (FR) . | | 2289992 | 12/1995 | (GB) . |
| 123906 | 3/1919 | (GB) . | | 2308490 | 6/1997 | (GB) . |
| 268271 | 3/1927 | (GB) . | | 2332557 | 6/1999 | (GB) . |
| 293861 | 11/1928 | (GB) . | | 175494 | 11/1981 | (HU) . |
| 292999 | 4/1929 | (GB) . | | 60206121 | 3/1959 | (JP) . |
| 319313 | 7/1929 | (GB) . | | 57043529 | 8/1980 | (JP) . |
| 518993 | 3/1940 | (GB) . | | 57126117 | 5/1982 | (JP) . |
| 537609 | 6/1941 | (GB) . | | 59076156 | 10/1982 | (JP) . |
| 540456 | 10/1941 | (GB) . | | 59159642 | 2/1983 | (JP) . |
| 589071 | 6/1947 | (GB) . | | 6264964 | 9/1985 | (JP) . |
| 666883 | 2/1952 | (GB) . | | 1129737 | 5/1989 | (JP) . |
| 685416 | 1/1953 | (GB) . | | 62320631 | 6/1989 | (JP) . |
| 702892 | 1/1954 | (GB) . | | 2017474 | 1/1990 | (JP) . |
| 715226 | 9/1954 | (GB) . | | 3245748 | 2/1990 | (JP) . |
| 723457 | 2/1955 | (GB) . | | 4179107 | 11/1990 | (JP) . |
| 739962 | 11/1955 | (GB) . | | 318253 | 1/1991 | (JP) . |
| 763761 | 12/1956 | (GB) . | | 424909 | 1/1992 | (JP) . |
| 805721 | 12/1958 | (GB) . | | 5290947 | 4/1992 | (JP) . |
| 827600 | 2/1960 | (GB) . | | 6196343 | 12/1992 | (JP) . |
| 854728 | 11/1960 | (GB) . | | 6233442 | 2/1993 | (JP) . |
| 870583 | 6/1961 | (GB) . | | 6325629 | 5/1993 | (JP) . |
| 913386 | 12/1962 | (GB) . | | 7057951 | 8/1993 | (JP) . |
| 965741 | 8/1964 | (GB) . | | 7264789 | 3/1994 | (JP) . |
| 992249 | 5/1965 | (GB) . | | 8167332 | 12/1994 | (JP) . |
| 1024583 | 3/1966 | (GB) . | | 7161270 | 6/1995 | (JP) . |
| 1053337 | 12/1966 | (GB) . | | 8264039 | 11/1995 | (JP) . |
| 1059123 | 2/1967 | (GB) . | | 9200989 | 1/1996 | (JP) . |
| 1103098 | 2/1968 | (GB) . | | 8036952 | 2/1996 | (JP) . |

| | | | | | | |
|---|---|---|---|---|---|---|
| 8167360 | 6/1996 | (JP) . | | WO9745937 | 12/1997 | (WO) . |
| 67199 | 3/1972 | (LU) . | | WO9745938 | 12/1997 | (WO) . |
| 90308 | 9/1937 | (SE) . | | WO9745939 | 12/1997 | (WO) . |
| 305899 | 11/1968 | (SE) . | | WO9747067 | 12/1997 | (WO) . |
| 255156 | 2/1969 | (SE) . | | WO 98/20598 | 5/1998 | (WO) . |
| 341428 | 12/1971 | (SE) . | | WO 98/20602 | 5/1998 | (WO) . |
| 453236 | 1/1982 | (SE) . | | WO9820595 | 5/1998 | (WO) . |
| 457792 | 6/1987 | (SE) . | | WO9820596 | 5/1998 | (WO) . |
| 502417 | 12/1993 | (SE) . | | WO9820597 | 5/1998 | (WO) . |
| 792302 | 1/1971 | (SU) . | | WO9820600 | 5/1998 | (WO) . |
| 425268 | 9/1974 | (SU) . | | WO9821385 | 5/1998 | (WO) . |
| 1019553 | 1/1980 | (SU) . | | WO 98/00468 | 6/1998 | (WO) . |
| 694939 | 1/1982 | (SU) . | | WO9827634 | 6/1998 | (WO) . |
| 955369 | 8/1983 | (SU) . | | WO9827635 | 6/1998 | (WO) . |
| 1511810 | 5/1987 | (SU) . | | WO9827636 | 6/1998 | (WO) . |
| WO8202617 | 8/1982 | (WO) . | | WO9829927 | 7/1998 | (WO) . |
| WO8502302 | 5/1985 | (WO) . | | WO9829928 | 7/1998 | (WO) . |
| WO9011389 | 10/1990 | (WO) . | | WO9829929 | 7/1998 | (WO) . |
| WO9012409 | 10/1990 | (WO) . | | WO9829930 | 7/1998 | (WO) . |
| WO 90/00279 | 11/1990 | (WO) . | | WO9829931 | 7/1998 | (WO) . |
| WO9101059 | 1/1991 | (WO) . | | WO9829932 | 7/1998 | (WO) . |
| WO9101585 | 2/1991 | (WO) . | | WO 98/34239 | 8/1998 | (WO) . |
| WO9107807 | 3/1991 | (WO) . | | WO9833731 | 8/1998 | (WO) . |
| WO 91/00077 | 4/1991 | (WO) . | | WO9833736 | 8/1998 | (WO) . |
| WO9109442 | 6/1991 | (WO) . | | WO9833737 | 8/1998 | (WO) . |
| WO 91/11841 | 8/1991 | (WO) . | | WO9834240 | 8/1998 | (WO) . |
| WO 91/15755 | 10/1991 | (WO) . | | WO9834241 | 8/1998 | (WO) . |
| WO8115862 | 10/1991 | (WO) . | | WO9834242 | 8/1998 | (WO) . |
| WO9201328 | 1/1992 | (WO) . | | WO9834243 | 8/1998 | (WO) . |
| WO9203870 | 3/1992 | (WO) . | | WO9834244 | 8/1998 | (WO) . |
| WO9321681 | 10/1993 | (WO) . | | WO9834245 | 8/1998 | (WO) . |
| WO9406194 | 3/1994 | (WO) . | | WO9834246 | 8/1998 | (WO) . |
| WO9518058 | 7/1995 | (WO) . | | WO9834247 | 8/1998 | (WO) . |
| WO9522153 | 8/1995 | (WO) . | | WO9834248 | 8/1998 | (WO) . |
| WO9524049 | 9/1995 | (WO) . | | WO9834249 | 8/1998 | (WO) . |
| WO9622606 | 7/1996 | (WO) . | | WO9834250 | 8/1998 | (WO) . |
| WO9622607 | 7/1996 | (WO) . | | WO9834309 | 8/1998 | (WO) . |
| WO 96/00010 | 10/1996 | (WO) . | | WO9834312 | 8/1998 | (WO) . |
| WO9630144 | 10/1996 | (WO) . | | WO9834315 | 8/1998 | (WO) . |
| WO9710640 | 3/1997 | (WO) . | | WO9834321 | 8/1998 | (WO) . |
| WO9711831 | 4/1997 | (WO) . | | WO9834322 | 8/1998 | (WO) . |
| WO9716881 | 5/1997 | (WO) . | | WO9834323 | 8/1998 | (WO) . |
| WO 97/29494 | 8/1997 | (WO) . | | WO9834325 | 8/1998 | (WO) . |
| WO9745288 | 12/1997 | (WO) . | | WO9834326 | 8/1998 | (WO) . |
| WO9745847 | 12/1997 | (WO) . | | WO9834327 | 8/1998 | (WO) . |
| WO9745848 | 12/1997 | (WO) . | | WO9834328 | 8/1998 | (WO) . |
| WO9745906 | 12/1997 | (WO) . | | WO9834329 | 8/1998 | (WO) . |
| WO9745907 | 12/1997 | (WO) . | | WO9834330 | 8/1998 | (WO) . |
| WO9745912 | 12/1997 | (WO) . | | WO9834331 | 8/1998 | (WO) . |
| WO9745914 | 12/1997 | (WO) . | | WP9834238 | 8/1998 | (WO) . |
| WO9745915 | 12/1997 | (WO) . | | WO 98/40627 | 9/1998 | (WO) . |
| WO9745916 | 12/1997 | (WO) . | | WO 98/43336 | 10/1998 | (WO) . |
| WO9745918 | 12/1997 | (WO) . | | WO9917309 | 4/1999 | (WO) . |
| WO9745919 | 12/1997 | (WO) . | | WO9917311 | 4/1999 | (WO) . |
| WO9745920 | 12/1997 | (WO) . | | WO9917312 | 4/1999 | (WO) . |
| WO9745921 | 12/1997 | (WO) . | | WO9917313 | 4/1999 | (WO) . |
| WO9745922 | 12/1997 | (WO) . | | WO9917314 | 4/1999 | (WO) . |
| WO9745923 | 12/1997 | (WO) . | | WO9917315 | 4/1999 | (WO) . |
| WO9745924 | 12/1997 | (WO) . | | WO9917316 | 4/1999 | (WO) . |
| WO9745925 | 12/1997 | (WO) . | | WO9917422 | 4/1999 | (WO) . |
| WO9745926 | 12/1997 | (WO) . | | WO9917424 | 4/1999 | (WO) . |
| WO9745927 | 12/1997 | (WO) . | | WO9917425 | 4/1999 | (WO) . |
| WO9745928 | 12/1997 | (WO) . | | WO9917426 | 4/1999 | (WO) . |
| WO9745929 | 12/1997 | (WO) . | | WO9917427 | 4/1999 | (WO) . |
| WO9745930 | 12/1997 | (WO) . | | WO9917428 | 4/1999 | (WO) . |
| WO9745931 | 12/1997 | (WO) . | | WO9917429 | 4/1999 | (WO) . |
| WO9745932 | 12/1997 | (WO) . | | WO9917432 | 4/1999 | (WO) . |
| WO9745933 | 12/1997 | (WO) . | | WO9917433 | 4/1999 | (WO) . |
| WO9745934 | 12/1997 | (WO) . | | WO9919963 | 4/1999 | (WO) . |
| WO9745935 | 12/1997 | (WO) . | | WO9919969 | 4/1999 | (WO) . |
| WO9745936 | 12/1997 | (WO) . | | WO9919970 | 4/1999 | (WO) . |

| | | |
|---|---|---|
| WO 98/02148 | 6/1999 | (WO) . |
| WO 99/28922 | 6/1999 | (WO) . |
| WO 99/29005 | 6/1999 | (WO) . |
| WO 99/29023 | 6/1999 | (WO) . |
| WO 99/29025 | 6/1999 | (WO) . |
| WO9927546 | 6/1999 | (WO) . |
| WO9928919 | 6/1999 | (WO) . |
| WO9928921 | 6/1999 | (WO) . |
| WO9928923 | 6/1999 | (WO) . |
| WO9928924 | 6/1999 | (WO) . |
| WO9928925 | 6/1999 | (WO) . |
| WO9928926 | 6/1999 | (WO) . |
| WO9928927 | 6/1999 | (WO) . |
| WO9928928 | 6/1999 | (WO) . |
| WO9928929 | 6/1999 | (WO) . |
| WO9928930 | 6/1999 | (WO) . |
| WO9928931 | 6/1999 | (WO) . |
| WO9928934 | 6/1999 | (WO) . |
| WO9928994 | 6/1999 | (WO) . |
| WO9929005 | 6/1999 | (WO) . |
| WO9929008 | 6/1999 | (WO) . |
| WO9929011 | 6/1999 | (WO) . |
| WO9929012 | 6/1999 | (WO) . |
| WO9929013 | 6/1999 | (WO) . |
| WO9929014 | 6/1999 | (WO) . |
| WO9929015 | 6/1999 | (WO) . |
| WO9929016 | 6/1999 | (WO) . |
| WO9929017 | 6/1999 | (WO) . |
| WO9929018 | 6/1999 | (WO) . |
| WO9929019 | 6/1999 | (WO) . |
| WO9929020 | 6/1999 | (WO) . |
| WO9929021 | 6/1999 | (WO) . |
| WO9929022 | 6/1999 | (WO) . |
| WO9929024 | 6/1999 | (WO) . |
| WO9929026 | 6/1999 | (WO) . |
| WO9929029 | 6/1999 | (WO) . |
| WO9929034 | 6/1999 | (WO) . |

OTHER PUBLICATIONS

High Voltage Cables in a New Class of Generators Powerformer; M. Leijon et al; Jun. 14, 1999; pp1–8.

Ohne Tranformator direkt ins Netz; Owman et al, ABB, AB; Feb. 8, 1999; pp48–51.

Submersible Motors and Wet–Rotor Motors for Centrifugal Pumps Submerged in the Fluid Handled; K.. Bienick, KSB; Feb. 25, 1988; pp9–17.

High Voltage Generators; G. Beschastnov et al; 1977; vol. 48. No. 6 pp1–7.

Eine neue Type von Unterwassermotoren; Electrotechnik und Maschinenbam, 49; Aug. 1931; pp2–3.

Problems in design of the 110–50okV high–voltage generators; Nikiti et al; World Electrotechnical Congress; Jun. 21–27, 1977; Section 1. Paper #18.

Manufacture and Testing of Roebel bars; P. Marti et al; 1960, Pub.86, vol. 8, pp25–31.

Hydroalternators of 110 to 220 kV Elektrotechn. Obz., vol. 64, No. 3, ppl32–136 Mar. 1975; A. Abramov.

Design Concepts for an Amorphous Metal Distribution Transformer; E. Boyd et al; IEEE 11/84.

Neue Wege zum Bau zweipoliger Turbogeneratoren bis 2 GVA, 60kV Elektrotechnik und Maschinenbau Wien Janner 1972, Heft 1, Seite 1–11; G. Aicholzer.

Optimizing designs of water–resistant magnet wire; V. Kuzenev et al; Elektroteknika, vol. 59, No. 12, pp35–40, 1988.

Zur Entwicklung der Tauchpumpenmotoren; A. Schanz; KSB, pp19–24.

Direct Generation of alternating current at high voltages; R. Parsons; IEEE Journal, vol. 67 #393, Jan. 15, 1929; pp1065–1080.

Stopfbachslose Umwalzpumpen– ein wichtiges Element im modernen Kraftwerkbau; H. Holz, KSB 1, pp13–19, 1960.

Zur Geschichte der Brown Boveri–Synchron–Maschinen; Vierzig Jahre Generatorbau; Jan.–Feb. 1931 pp15–39.

Technik und Anwendung moderner Tauchpumpen; A. Heumann; 1987.

High capacity synchronous generator having no tooth stator; V.S. Kildishev et al; No. 1, 1977 pp11–16.

Der Asynchronmotor als Antrieb stopfbcichsloser Pumpen; E. Picmaus; Eletrotechnik und Maschinenbay No. 78, pp153–155, 1961.

Low core loss rotating flux transformer; R. F. Krause, et al; American Institute Physics J.Appl.Phys vol. 64 #10 Nov. 1988, pp5376–5378.

An EHV bulk Power transmission line Made with Low Loss XLPE Cable;Ichihara et al; 8/92; pp3–6.

Underground Transmission Systems Reference Book; 1992; pp16–19; pp36–45; pp67–81.

Power System Stability and Control; P. Kundur, 1994; pp23–25; p. 767.

Six phase Synchronous Machine with AC and DC Stator Connections, Part II:Harmonic Studies and a proposed Uninterruptible Power Supply Scheme; R. Schiferl et al.;Aug. 1983 pp 2694–2701.

Six phase Synchronous Machine with AC and DC Stator Connections, Part 1: Equivalent circuit representation and Steady–State Analysis; R. Schiferl et al; Aug. 1983; pp2685–2693.

Reactive Power Compensation; T. Petersson; 1993; pp 1–23.

Permanent Magnet Machines; K. Binns; 1987; pp 9–1 through 9–26.

Hochspannungsaniagen for Wechselstrom; 97. Hochspannungsaufgaben an Generatoren und Motoren; Roth et al; 1938; pp452–455.

Hochspannungsanlagen for Wechselstrom; 97. Hochspannungsaufgaben an Generatoren und Motoren; Roth et al; Spring 1959, pp30–33.

Neue Lbsungswege zum Entwurf grosser Turbogeneratoren bis 2GVA, 60kV; G. Aicholzer; Sep. 1974, pp249–255.

Advanced Turbine–generators– an assessment; A. Appleton, et al; International Conf. Proceedings, Lg HV Elec. Sys. Paris, FR, Aug.–Sep. 1976, vol. I, Section 11–02, p. 1–9.

Fully slotless turbogenerators; E. Spooner; Proc., IEEE vol. 120 #12, Dec. 1973.

Toroidal winding geometry for high voltage superconducting alternators; J. Kirtley et al; MIT—Elec. Power Sys. Engrg. Lab for IEEE PES; Feb. 1974.

High–Voltage Stator Winding Development; D. Albright et al; Proj. Report EL339, Project 1716, Apr. 1984.

POWERFORMER ™: A giant step in power plant engineering; Owman et al; CIGRE 1998, Paper 11:1.1.

Thin Type DC/DC Converter using a coreless wire transformer; K. Onda et al; Proc. IEEE Power Electronics Spec. Conf.; Jun. 1994, pp330–334.

Development of extruded polymer insulated superconducting cable; Jan. 1992.

Transformer core losses; B. Richardson; Proc. IEEE May 1986, pp365–368.

Cloth–transformer with divided windings and tension annealed amorphous wire; T. Yammamoto et al; IEEE Translation Journal on Magnetics in Japan vol. 4, No. 9 Sep. 1989.

A Study of equipment sizes and constraints for a unified power flow controller; J Bian et al; IEEE 1996.

A test installation of a self–tuned ac filter in the Konti–Skan 2 HVDC link; T. Holmgren, G. Asplund, S. Valdemarsson, P. Hidman of ABB; U. Jonsson of Svenska Krafnat; O. loof of Vattenfall Vastsverige AB; IEEE *Stockholm Power Tech Conference* Jun./1995, pp. 64–70.

Analysis of faulted Power Systems; P Anderson, Iowa State University Press/Ames, Iowa, 1973, pp. 255–257.

36–Kv. Generators Arise from Insulation Research; P. Sidler; Electrical World Oct. 15, 1932, p. 524.

Oil Water cooled 300 MW turbine generator; L.P. Gnedin et al.; Elektrotechnika, 1970, pp. 6–8.

J&P Transformer Book 11$^{th}$ Edition; A. C. Franklin et al; owned by Butterworth–Heinemann Ltd, Oxford Printed by Hartnolls Ltd in Great Britain 1983, pp.29–67.

*Transformerboard*; H.P. Moser et al; 1979, pp. 1–19.

*The Skagerrak transmission–the world's longest HVDC submarine cable link*; L. Haglof et al. of of ASEA; ASEA Journal vol. 53, No. 1–2, 1980. pp. 3–12.

*Direct Connection of Generators to HVDC Converters*: Main Characteristic and Comparative Advantages; J. Arrillaga et al; Electra No. 149,Aug./1993, pp. 19–37.

Our flexible friend article; M. Judge: *New Scientist*, May 10, 1997, pp. 44–48.

*In–Service Performance of HVDC Converter transformers and oil–cooled smoothing reactors*; G.L. Desilets et al; *Electra* No. 155, Aug./1994, pp. 7–29.

Transformateurs a courant continu haute tension–examen des specifications; A. Lindroth et al; *Electra* No. 141, Apr./1992, pp. 34–39.

Development of a Termination for the 77 kV–Class High Tc Superconducting Power Cable; T. Shimonosono et al; IEEE *Power Delivery*, vol. 12, No, Jan./1997, pp. 33–38.

Verification of Limiter Performance in Modern Excitation Control Systems; G. K. Girgis et al; IEEE *Energy Conservation*, vol. 10, No. 3, Sep./1995, pp. 538–542.

A High Initial response Brushless Excitation System; T. L. Dillman et al; IEEE *Power Generation Winter Meeting Proceedings*, Jan. 31, 1971, pp. 2089–2094.

Design, manufacturing and cold test of a superconducting coil and its cryostat for SMES applications; A. Bautista et al; IEEE *Applied Superconductivity*, vol. 7, No. 2, Jun./1997, pp. 853–856.

Quench Protection and Stagnant Normal Zones in a Large Cryostable SMES; Y. Lvovsky et al; IEEE *Applied Superconductivity*, vol. 7, No. 2, Jun./1997, pp. 857–860.

Design and Construction of the 4 Tesla Background Coil for the Navy SMES Cable Test Apparatus; D.W. Scherbarth et al; IEEE *Appliel Superconductivity*, vol. 7, No. 2, Jun./1997, pp. 840–843.

*High Speed Synchronous Motors Adjustable Speed Drives*; ASEA Generation Pamhlet OG 135–101 E, Jan./1985, pp. 1–4.

*Billig burk motar overtonen*; A, Felldin; ERA (TEKNIK) Aug./1994, pp. 26–28.

400–kV XLPE cable system passes CIGRE test; ABB Article; ABB Review Sep./1995, p. 38.

FREQSYN–a new drive system for high power applications; J–A, Bergman et al; ASEA*Journal*59, Apr./1986, pp.16–19.

Canandians Create Conductive Concrete; J. Beaudion et al; *Science*, vol. 276, May 23, 1997, pp. 1201.

*Fully Water–Cooled 190 MVA Generators in the Tonstad Hydroelectric Power Station*; E. Ostby et al; BBC Review Aug./1969, pp. 380–385.

Relocatable static var compensators help control unbundled power flows; R. C. Knight et atl; *Transmission & Distribution*, Dec./1996, pp. 49–54.

Investigation and Use of Asynchronized Machines in Power Systems*; N.I.Blotskii et al; *Elektrichestvo*, No. 12, 1–6, 1985, pp. 90–99.

*Variable–speed switched reluctance motors*; P.J. Lawrenson et al; IEE proc, vol. 127, Pt.B, No. 4, Jul./1980, pp. 253–265.

*Das Einphasenwechselstromsystem hoherer Frequenz*; J.G. Heft; Elektrische Bahneneb; Dec./1987, pp. 388–389.

*Power Transmission by Direct Current;E. Uhlmann*;ISBN 3–540–07122–9 Springer–Verlag, Berlin/Heidelberg/New York; 1975, pp. 327–328.

Elektriska Maskiner; F. Gustavson; *Institute for Elkreafteknilk*, KTH; Stockholm, 1996, pp. 3–6–3–12.

*Die Wechselstromtechnik*; A. Cour' Springer Verlag, Germany; 1936, pp. 586–598.

*Isulation systems for superconducting transmission cables*; O.Toennesen; Nordic Insulation Symposium, Bergen, 1996, pp. 425–432.

MPTC: *An economical alternative to universal power flow controllers*;N. Mohan; EPE 1997, Trondheim, pp. 3.1027–3.1030.

*Lexikon der Technik*; Luger; Band 2, Grundlagen der Elekrotechnik und Kerntechnik, 1960, pp. 395.

Das Handbuch der Lokomotiven (hungarian locomotive V40 1 'D'); B. Hollingsworth et al; Pawlak Verlagsgesellschaft; 1933, pp. 254–255.

Synchronous machines with single or double 3–phase star–connected winding fed by 12–pulse load commutated inverter. *Simulation of operational behaviour*; C. Ivarson et al; ICEM 1994, International Conference on electrical machines, vol. 1, pp. 267–272.

Elkrafthandboken, Elmaskiner; A. Rejminger; Elkrafthandboken, Elmaskiner 1996, 15–20.

*Power Electronics–in Theory and Practice*; K. Thorborg; ISBN 0–86238–341–2, 1993, pp. 1–13.

*Regulating transformers in power systems–new concepts and applications*; E. Wirth et al; ABB Review Apr./1997, pp. 12–20.

Transforming transformers; S. Mehta et al; IEEE *Spectrum*, Jul. 1997, pp. 43–49.

A study of equipment sizes and constraints for a unified power flow controller; J. Bian et al; IEEE *Transactions on Power Delivery*, vol. 12, No.3, Jul. 1997, pp. 1385–1391.

*Industrial High Voltage*; F.H. Kreuger; *Industrial High Voltage*1991 vol. I, pp. 113–117.

*Hochspannungstechnik*; A. Küchler; Hochspannungstechnik, VDI Verlag 1996, pp. 365–366, ISBN 3–18–401530–0 or 3–540–62070–2.

*High Voltage Engineering*; N.S. Naidu; *High Voltage Engineering*, second edition 1995 ISBN 0–07–462286–2, Chapter 5, pp. 91–98.

Performance Characteristics of a Wide Range Induction Type Frequency Converter; G.A. Ghoneem; *Ieema Journal*, Sep. 1995, pp. 21–34.

*International Electrotechnical Vocabulary*, Chapter 551 Power Electronics; unknown author; *International Electrotechnical Vocabulary* Chapter 551; *Power Electronics Bureau Central de la Commision Electrotechnique Internationale*, Geneve; 1982, pp. 1–65.

Design and manufacture of a large superconducting homopolar motor; A.D. Appleton; IEEE *Transactions on Magnetics*, vol. 19, No. 3, Part 2, May/1983, pp. 1048–1050.

Application of high temperature superconductivy to electric motor design; J.S. Edmonds et al; IEEE *Transactions on Energy Conversion* Jun./1992, No. 2, pp. 322–329.

Power Electronics and Variable Frequency Drive; B. Bimal; IEEE *industrial Electronics–Technology and Applications*, 1996, pp. 356.

Properties of High Plymer Cement Mortar; M. Tamai et al; *Science & Technology in Japan*, No. 63; 1997, pp. 6–14.

Weatherability of Polymer–Modified Mortars after TenYear Outdoor Exposure in Koriyama and Sapporo; Y. Ohama et al; *Science & Technology in Japan* No. 63; 1997, pp. 26–31.

*SMC Powders Open New Magnetic Applications*; M. Persson (Editor); SMC Update, vol. 1, No. 1 Apr. 1997.

Characteristics of a laser triggered spark gap using air, Ar, CH4,H2, He, N2, SF6 and Xe; W.D. Kimura et al; *Journal of Applied Physics*, vol. 63, No. 6, 15 Mar. 1988, pp. 1882–1888.

Low–intensy laser–triggering of rail–gaps with magnesium–aerosol switching–gases; W. Frey; 11th International Pulse Power Conference, 1997, Baltimore, *USA Digest of Technical Papers*, pp. 322–327.

\* cited by examiner

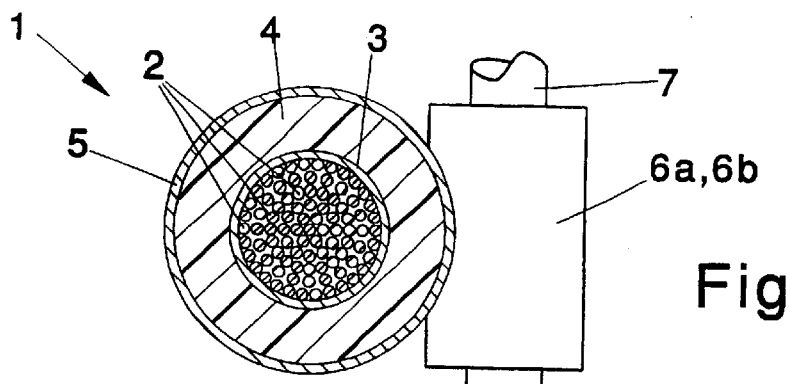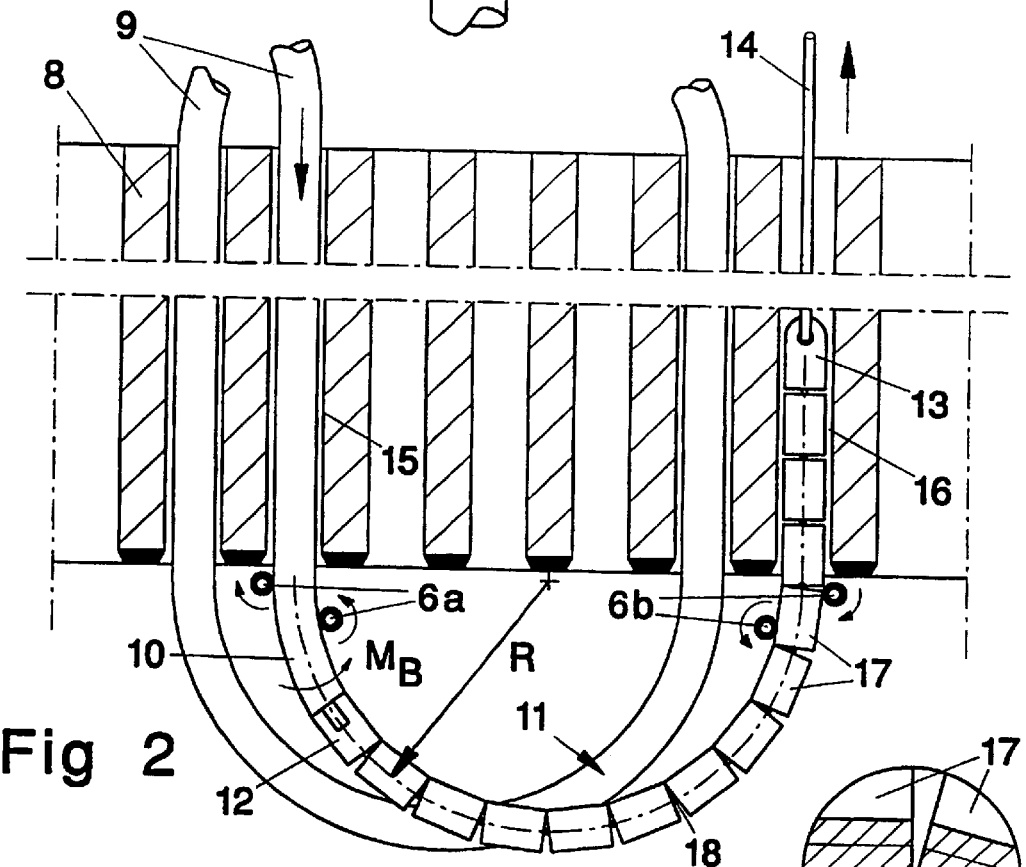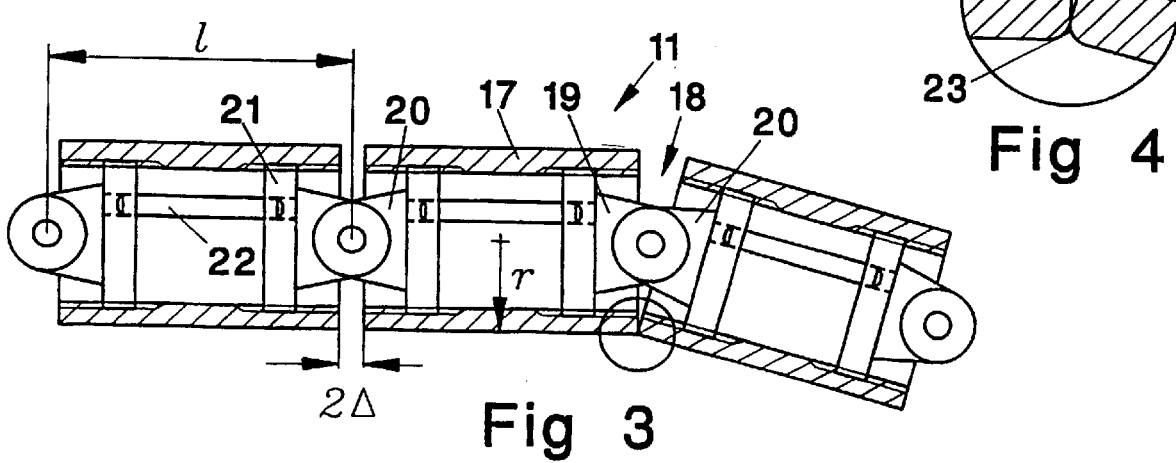

CABLE FORERUNNER

TECHNICAL FIELD

The present invention relates to electric machines such as transformers, synchronous machines, normal asynchronous machines as well as dual-fed machines, applications in asynchronous static current converter cascades, outerpole machines and synchronous flow machines as well as alternating current machines intended in the first place as generators in power stations for generating electric power. The invention relates particularly to the winding procedure in such machines.

BACKGROUND ART

Conventional machines have been designed for voltages in the range 15–30 kV, and 30 kV has normally been considered to be an upper limit. In the case of generators this normally means that a generator must be connected to the power network via a step-up transformer. The voltage level of the power network can be in the range of approximately 130–400 kV.

The present invention is intended to be used with high voltages. In this specification the term "High voltages" means electric voltages exceding 10 kV, Typically, an operating range for a machine wound in accordance with the invention and using a cable forerunner according to the invention may be voltages from 36 kV up to 800 kV.

By using high-voltage insulated electric conductors in the following termed high-voltage cables, with solid insulation similar to that used in cables for transmitting electric power (e.g. XLPE cables) in a rotating electric machine, the voltage of the machine can be increased to such levels that it can be connected directly to the power network without intermediate transformers. The conventional transformer can thus be eliminated. The cable is provided with an outer semiconducting layer with the help of which its outer potential is defined. The high voltage cables thus enclose the electrical field within the windings. Such an insulated conductor or cable is flexible and it is of a kind which is described more in detail in the PCT applications SE97/00874 and SE97/00875. Additional descriptions of the concerned insulated conductor or cable can be found in the PCT applications SE 97/009001, SE 97/00902 and SE97/00903.

This concept generally implies that the slots in which the cables are arranged in the stator to be deeper than conventional technology (thicker insulation due to higher voltage and more turns in the winding). This entails new problems in winding the high-voltage cable in such machines.

Many different methods are available for winding the stator in a rotating electric machine with conventional windings. However, all these methods presume that the windings are stiff and can be inserted without being wound. Further, conventional windings are normally divided into short parts to fit the slots of the stator. These methods cannot be used in the present invention, where the windings consist of high voltage cables of substantial lengths, which have large diameter, high weight per unit length and high flexural rigidity. Further, during the winding process, the outer semiconducting layer of the cable must not be damaged. The difficulties in winding such a cable are thus considerable.

OBJECT OF THE INVENTION

The object of the invention is to provide a device and a procedure that enables the winding of a high-voltage cable in an electric machine where the space available for handling the cable is also limited.

Advantageous further developments of the invention are indicated in the following description.

SUMMARY OF THE INVENTION

The present invention relates to a procedure and a device for winding high-voltage cables in an electric machine, such as the stator winding in a high-voltage alternating current generator.

In order to achieve the desired shape, radius, in a flexurally rigid cable in a end winding region in a continuous process when winding the stator for an electric machine, a cable forerunner is used that pulls the cable behind it. This cable forerunner comprises a chain of suitably long rigid or flexible, pliable cylindrical links connected to a jointed coupling at their axial centre. A suitable gap (A) is provided between the links in a straight chain at the outer edge of the cylindrical link arms. When the chain is bent the radius is limited to a fixed desired value at which contact occurs between the links at their outer radius. The radius (R) of the cable forerunner (chain) is determined by the gap between the links of the chain. its outer radius and length in accordance with the formula $1/2R = \Delta/r$, which is to be further explained in the following description. As a result of said property the cable forerunner can guide the cable directly through straight slots in the stator and be formed into the desired arc between two slots at the coil end part of the stator. The radius of a bent chain can be varied by varying the gap between links designed in accordance with an embodiment as described below.

The invention thus comprises a special cable forerunner designed with a number of links connected by joints, and the distance between the links can be adjusted to define a minimum radius of curvature for the cable forerunner. The cable forerunner is thus rigid at its limit radius but otherwise behaves in substantially the same manner as a rope.

BRIEF DESCRIPTION OF THE DRAWINGS

The invention will be described in more detail in the following with reference to the accompanying drawings in which FIG. 1 shows a cross section through a high-voltage cable used in the present winding procedure, FIG. 2 shows an axial section through a stator being wound in accordance with the invention.

FIG. 3 shows a section through a cable forerunner according to the invention.

FIG. 4 shows a detail from FIG. 3.

DESCRIPTION OF THE INVENTION

FIG. 1 shows a cross-sectional view of a high-voltage cable 1 to be wound in accordance with the present invention. The high-voltage cable 1 comprises a number of strand parts 2 made of copper (Cu), for instance, and having circular cross section. These strand parts 2 are arranged in the middle of the high-voltage cable 1. The conductor area is between 30 and 3000 square mm. Around the strand parts 2 is a first semiconducting layer 3. Around the first semiconducting layer 3 is an insulating layer 4, e.g. XLPE insulation. Around the insulating layer 4 is a second semiconducting layer 5. The outer cable diameter is between 20 and 350 mm. Thus the concept "high-voltage cable" in the present application thus need not include the metal screen and the outer protective sheath that normally surround such a cable for power distribution.

FIG. 1 also shows a guide roller acting as first or second guide means 6a, 6b, which may be coated with rubber or a rubberlike material, journalled or fixed on a shaft 7 in contact with the outer semiconducting layer 5 of the high-voltage cable 1 in order to rotationally absorb flexural moment applied to the high-voltage cable as this is pulled or fed in its axial direction, FIG. 2 shows an axial section through a machine body 8 which in the Figure consists of a stator in a rotating electric machine being wound with its stator winding 9 in the form of a high-voltage cable as described above. A cable forerunner 11 is connected to the end 10 of the cable with the help of a connector 12 in the form of a clamp connection, for instance. The other end of the cable forerunner is provided with a traction member 13 with a wire 14 attached. By means of the wire 14, therefore, the cable can thus be drawn in and out through a first slot 15 arranged in the machine body 8, and on into a second slot 16, out through this and so on. The cable forerunner 11 is formed from a number of rigid, sleevelike, cylindrical links 17 connected together by joints 18. The joint may be in the form of a ball and socket joint or a joint for moving around only one axis. The material in the cable forerunner is preferably plastic and/or aluminium. The diameter of the cable forerunner is slightly less than the diameter of the cable.

To facilitate shaping the unyielding cable to the desired curve, guide members 6a, 6b are placed at outgoing and ingoing slots as first guide members 6a and second guide members 6b, see FIG. 2. These rollers, preferably made of steel and coated with rubber, are arranged to absorb forces from the flexural moment $M_B$ which is required to bend the cable, enabling normal forces between cable and slot to be reduced. The guide members 6a, 6b may be passive or provided with a drive means feeding the cable at the desired speed and with the direction of rotation indicated by the arrows in FIG. 2. In this embodiment the radius can be adjusted by establishing different entry and exit speeds for the control members 6a. 6b.

The guide members are thus attached temporarily to the stator in order to absorb torque and to prevent the cable from being damaged against the slot. The rollers can be placed at several slots, about 15, in order to draw cable lengths of up to 100 m simultaneously. The rollers may be driven by a motor to feed the cable instead of or as well as the wire. The rollers may also be in the form of cylinders extending along the entire length of the stator.

FIG. 3 shows a detail of an advantageous embodiment of the cable forerunner 11 revealing that each joint 18 comprises a left part 19 connected to one end of a link 17 and a right part 20 connected to the other end of an adjacent link. Thus these parts together form an intermediate joint 18. Each link is provided with a left part 19 at one end and a right part 20 at the other end. At least the left part 19 or the right part 20 of each link 17 is secured in a spacer 21 axially movable in the link 17. The embodiment according to FIG. 3 shows both a left part 19 and a right part 20, each secured in such a spacer. In the embodiment shown each spacer 21 is screwed into one end of the link so that the spacer of the left part 19 has a left-hand thread and the spacer of the right part 20 has a right-hand thread. This implies that turning the links 17 relative to the joints 18 will alter the distance between each link 17. The operating principle is thus the same as for a screw shackle on a yacht. In order to facilitate this relative movement between links and joints, each link is provided with a locking element 22 which connects the two joint parts 19, 20 of the link. This locking element may, as shown in this embodiment, be in the form of a cotter pressed into the spacer 21. Turning of the links relative to the joints may be performed by providing the whole cable forerunner with a rubber sheath which is shrunk on and fixes the movement of the links relative to each other and, by turning the joints relative to the rubber sheath and thus the links, with the aid of a turning device not shown. An alternative embodiment is for one or more of the joints to be fixed by means of a radial blocking device running through them, while the axial distance between the links is adjusted by turning respective links.

The geometry of the cable forerunner according to FIGS. 2 and 3 is:

$$1/2R = \Delta/r$$

where:
l=the distance between the two joints of a link (sleeve).
R=the limit radius of the cable forerunner
Δ=the gap between link and joint,
r=the radius of a link (sleeve)
Example: l=100 mm. r=30 mm. R=500. which gives Δ=3 mm.

Thus the left-hand and right-hand threads at the ends of a link thus cause rotation of the outer cylindrical sleeve relative to its joint attachment to effect an alteration of the distance "l" between the sleeve joints and the gap "Δ" between the link and the joint. Turning at a single point furthest out at the ends of the cable forerunner results in adjustment of all the sleeve lengths. The sleeves should in this case be coherent from the turning point of view. A turning can be achieved by a motor, e.g. via an elastic, rubberlike, plastic hose shrunk onto the cable forerunner along its entire length as indicated above.

FIG. 4 shows a detail of the contact between two adjacent links when the cable forerunner has been curved to its defined minimum radius of curvature i.e. when the links 17 establish contact at a point or along a surface at both their end peripheries 23. The cylindrical ends of the links 17 are shown rounded off in the Figure but may also be provided with a number of peripherally arranged surfaces to allow a higher surface pressure.

What is claimed is:

1. A procedure for winding a high-voltage cable in an electric machine, comprising the steps of attaching one end of a cable forerunner to the end of the cable;

drawing the cable forerunner and the attached cable through a first slot in the machine body; and controlling the forerunner to a predefined radius of curvature so that the cable has a predefined curvature between its exit from the slot until its entry into a second slot in the machine body.

2. A procedure as claimed in claim 1, wherein controlling the radius of curvature of the cable comprises controlling the cable forerunner outside the machine body to establish a minimum radius or curvature of the forerunner.

3. A procedure as claimed in claim 2, wherein the forerunner is formed of interconnected articuable links having a selectable distance therebetween: and establishing the minimum radius of curvature of the cable forerunner comprises adjusting the selectable distance between the links.

4. A procedure as claimed in claim 3, wherein the interconnected links are rotatable relative to the joints: and establishing the minimum radius of curvature of the cable forerunner comprises rotating the links relative to the joints.

5. A procedure as claimed in claim 1, wherein the cable forerunner has a traction member, and drawing the forerunner comprises pulling the forerunner through the slots by the traction member.

6. A cable forerunner for winding a high-voltage cable between first and second slots in the body of an electric machine, wherein one end of the cable forerunner is attachable to the end of the cable for drawing the cable through the first slot, said forerunner having a minimum. radius of curvature to control the curvature of the cable at its exit from the slot until its entry into the second slot.

7. A cable forerunner as claimed in claim 6, comprising a number of rigid links and articuable joints connecting the joints.

8. A cable forerunner as claimed in claim 7, wherein each link has at least at one end and includes an axially displaceable spacer connected to the joint.

9. A cable forerunner as claimed in claim 8, further including a screw joint for connecting the spacer to the link.

10. A cable forerunner as claimed in claim 9, wherein each link has opposite axially displaced ends and includes a corresponding axially displaceable spacer at each end, and a screw joint for connecting each spacer to the corresponding link one screw joint of the link having a left-hand thread and the other screw joint of the link having a right-hand thread.

11. A cable forerunner as claimed in claim 10, further including a locking element for preventing rot between each joint.

12. A cable forerunner as claimed in claim 11, wherein the locking element is detachably inserted between each link for establishing a selected gap between the link and joint.

13. A cable forerunner as claimed in claim 12, wherein the cable forerunner is arranged to cooperate with guide members to facilitate curving the cable to the selected radius of curvature.

14. A cable forerunner as claimed in claim 13, wherein the guide members are motor-driven for drawing the cable from the first slot to the second slot.

15. A cable forerunner as claimed in claim 6, including first guide members arranged at the exit from the first slot; and second guide members arranged at the entry into the second slot; and one of the guide members is arranged to be driven with a speed deviating from the speed of the other guide member.

16. A cable forerunner attachable to the end of a cable for winding a high voltage machine and forming end windings between machine slots comprising: a plurality of interconnected links selectively articuable to a minimum radius of curvature R.

17. A cable forerunner as claimed in claim 16, wherein the links include a traction link at a distal end; a cable connector link at a proximal end attachable to the end of the cable; and a plurality of intermediate links interconnected between the traction link and connection link, adjacent ones of said links having a spacing for establishing a minimum bending radius R of the forerunner.

18. A cable forerunner as claimed in claim 16, wherein the adjacent links include confronting spaced apart end portions said spacers for establishing the minimum radius of curvature.

19. A cable forerunner as claimed in claim 18 wherein the each confronting end portions include a joint articuable in at least one plane.

20. A cable forerunner as claimed in claim 16, wherein the links comprise cylindrical members.

21. A cable forerunner as claimed in claim 16 wherein adjacent links have confronting circular open end portions, and a joint having a free connector end and a threadable end sleeved in the open end of the cylindrical member for establishing a selected distance between the free end and the circular end.

22. A cable forerunner as claimed in claim 21, wherein the cylindrical members have an adjustable overall length l between free ends, a radius r, and a distance A between the free end and the circular end such that $1/2R=r/\Delta$.

23. A cable forerunner as claimed in claim 21, wherein the confronting ends of the cylindrical members have threads in opposite senses.

24. A cable forerunner as claimed in claim 16, wherein the $1/2R=\Delta/r$ when I is the length of each link; $\Delta$ is a space between links; and r is a radius of each link.

25. A cable forerunner attachable to the end of a cable for winding a high voltage machine and forming end windings between machine slots comprising: a plurality of interconnected links selectively articuable to a selected radius of curvature R.

* * * * *